Oct. 28, 1952     B. AXEL     2,615,314

SELF-ADJUSTING FINGER RING

Filed July 11, 1952     3 Sheets-Sheet 1

INVENTOR.
BENJAMIN AXEL
BY F. J. Pisarra
ATTORNEY

Oct. 28, 1952      B. AXEL      2,615,314
SELF-ADJUSTING FINGER RING
Filed July 11, 1952      3 Sheets-Sheet 2
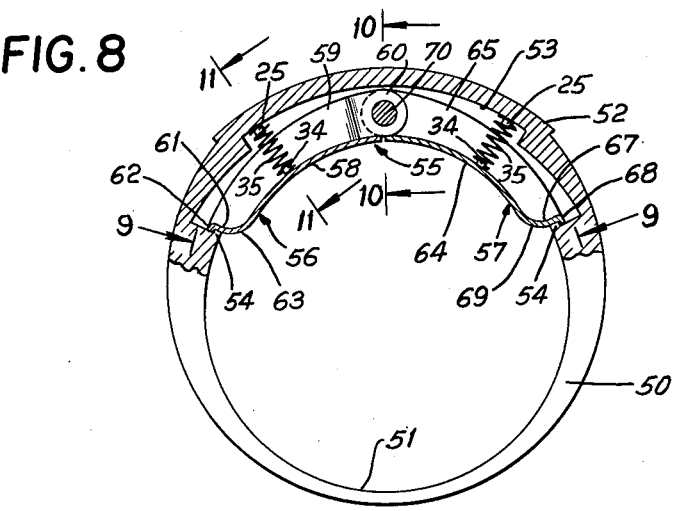
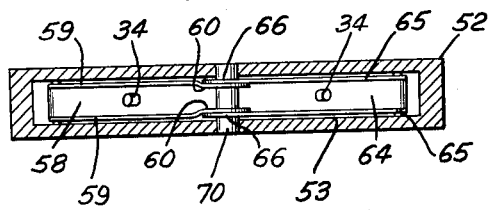
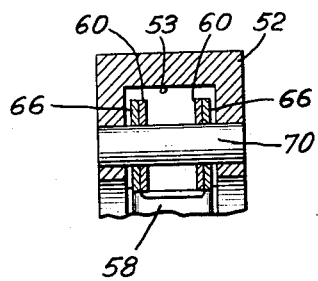 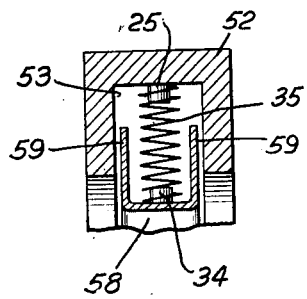
*INVENTOR.*
BENJAMIN AXEL
BY
*F. J. Pisarra*
ATTORNEY Oct. 28, 1952     B. AXEL     2,615,314
SELF-ADJUSTING FINGER RING Filed July 11, 1952     3 Sheets-Sheet 3

INVENTOR.
BENJAMIN AXEL
BY
F. J. Pisarra
ATTORNEY

Patented Oct. 28, 1952

2,615,314

UNITED STATES PATENT OFFICE 2,615,314

SELF-ADJUSTING FINGER RING

Benjamin Axel, Roslyn Heights, N. Y., assignor to Tru-Fit Company, New York, N. Y., a partnership Application July 11, 1952, Serial No. 298,406

15 Claims. (Cl. 63—16)

This invention relates to finger rings, and more particularly to such rings that are adapted to adjust themselves automatically to the finger of the user.

This application is a continuation-in-part of my pending applications Serial No. 181,358, filed August 25, 1950, and Serial No. 214,466, filed March 8, 1951.

It is a primary object of the invention to provide a self-adjusting finger ring having improved features of construction and design.

Another object of the invention is to provide a finger ring which, when properly positioned on a finger, remains in such position during normal use.

Another object of the invention is to provide a self-adjusting finger ring that is adapted to fit different sized fingers.

Another object of the invention is to provide a finger ring having a continuous band that may carry a decorative head or setting unit and that defines a finger-receiving opening, the effective area of the opening being adapted to be automatically increased to allow the ring to be readily passed over a knuckle of the wearer and subsequently contracted or decreased to fit the thinner portion of the finger where it unites with the palm of the hand.

Another object of the invention is to provide a ring of the character indicated that makes a snug, but comfortable fit on the finger of the wearer, the parts being so constructed and arranged as to prevent the ring from accidentally slipping off the finger without retarding or otherwise hampering normal circulation of blood through the finger.

The invention has for a further object the provision of a finger ring having incorporated therein adjusting means for varying the size thereof, which means is effectively concealed when the ring is in place on the finger of a user.

A still further object of the invention is to provide a self-adjusting finger ring that is simple, compact and sturdy in construction and design; that is reasonable in manufacturing cost; and that is capable of performing its intended functions in an efficient and trouble-free manner.

To the end that the foregoing objects may be readily attained, one recommended form of finger ring constructed in accordance with the invention comprises a continuous band that defines a generally circular finger-receiving opening. The band may be provided with a decorative head and has, in the region of the head, a recess that merges or communicates with the finger-receiving opening. The band is formed with a pair of spaced shoulders located in the recess-defining portion thereof and carries a pair of spaced spring-aligning elements or lugs that are located wholly within the recess.

Slidable in the recess is a suitable means for varying the effective area of the finger-receiving opening. This means may comprise a one-piece hollow member consisting of an arcuate bottom wall and pairs of spaced-apart parallel end and side walls. Each wall of one of the pairs of walls is provided with an integral, outwardly projecting lip that is adapted to engage a corresponding shoulder. A pair of compression springs, maintained in spaced relation by the aligning elements in the recess and corresponding aligning elements carried by the hollow member, normally and yieldingly urges the member in a direction toward the center of the finger-receiving opening. Movement of the member in such direction is limited by engagement of the lips with the shoulders.

The aforesaid lips may be carried by either the end walls or by the side walls of the hollow member. As is set forth in the detailed description that follows, and as is shown in the accompanying drawings, the shoulders formed in the band are disposed in locations for proper engagement by the lips. The parts are so constructed and arranged that the member may be readily inserted in the recess in a manner that the lip-carrying walls of the member are manually flexed inwardly until the lips pass the shoulders, whereupon those walls are automatically flexed outwardly so that the lips engage the shoulders to both limit movement of the member toward the center of the finger-receiving opening and prevent accidental removal of the member from the band.

Another recommended form of the invention contemplates employing a two-piece hollow member in lieu of the one-piece member referred to earlier herein, each piece comprising an arcuate bottom wall, a pair of side walls and an end wall having a shoulder-engaging lip. The pieces of this hollow member are pivotal with respect to each other and to the ring band about a common axis and are spring-pressed toward the center of the finger-receiving opening, as will be described in detail further along herein.

A further recommended form of finger ring constructed in accordance with this invention comprises a continuous band that defines a generally circular finger-receiving opening and that carries a mounting, or setting unit, which is adapted to support a gem or the like. The band is provided with a pair of circumferentially spaced recesses that lie to opposite sides of the setting unit and that merge or communicate with the finger-receiving opening. The band is also provided with a shoulder in each of its recess-defining portions and a spring-aligning element or pin located wholly within the corresponding recess.

In this form of the invention, the means for varying the effective area of the finger-receiving opening comprises a pair of hollow members and a pair of compression springs. Each hollow member is normally partly within a corresponding recess and is pivotally connected proximate one end of the band. Further, each member preferably consists of an arcuate bottom wall, and pairs of spaced-apart side and end walls that project into a corresponding band recess. One of the end walls is intermediate the pivotal connection between the member and the setting unit and has an outwardly projecting lip that engages the corresponding shoulder to limit pivotal movement of the member in an inward direction with respect to the band opening. One end portion of each spring is disposed in and engages the pin in a corresponding recess. The other end portion of each spring bears against the bottom wall of the member and is retained in predetermined position within the member by a pin that is carried by the member or by a means that may include a tongue which is struck from the member bottom wall and projects inwardly thereof. The parts are so constructed and arranged that each spring normally and yieldingly urges a corresponding member in an inward direction with respect to the band about its pivotal connection to the extent allowed by the corresponding lip and band shoulder.

The enumerated objects, as well as other objects, together with the advantages of the invention will be readily understood by persons skilled in the art upon reference to the following detailed description and the annexed drawings, which respectively describe and illustrate rings embodying the invention.

In the drawings:

Figure 1 is an end elevation view, partly in cross section, of a finger ring constructed in accordance with the invention, the self-adjusting means being omitted for better illustration of details of construction of the band;

Figure 2 corresponds to Figure 1 and shows the self-adjusting means operatively associated with the band;

Figure 2:
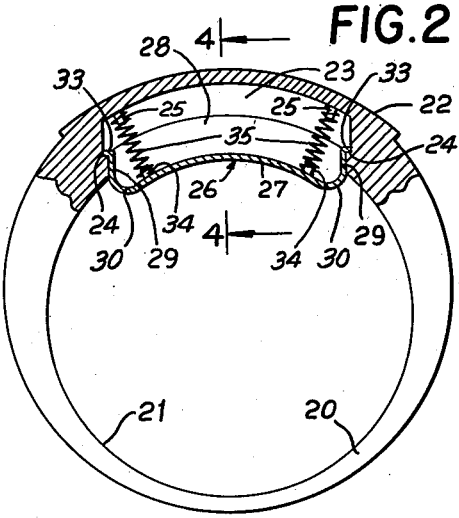
Figure 3:
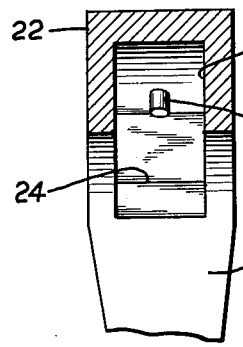
Figure 3 is a view in enlargement taken along line 3—3 of Figure 1.
Figure 12:
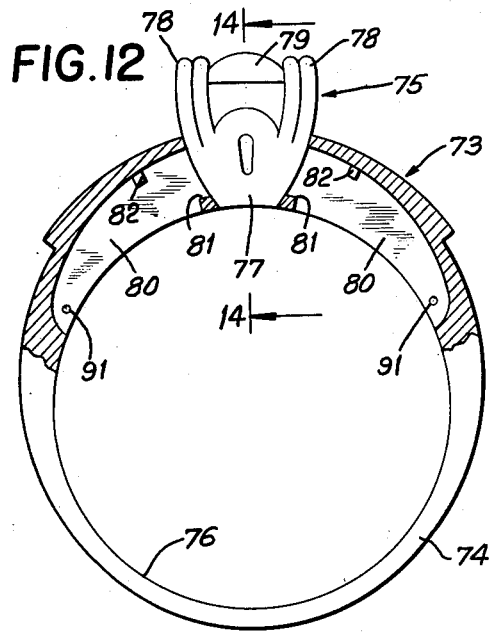
Figure 13:
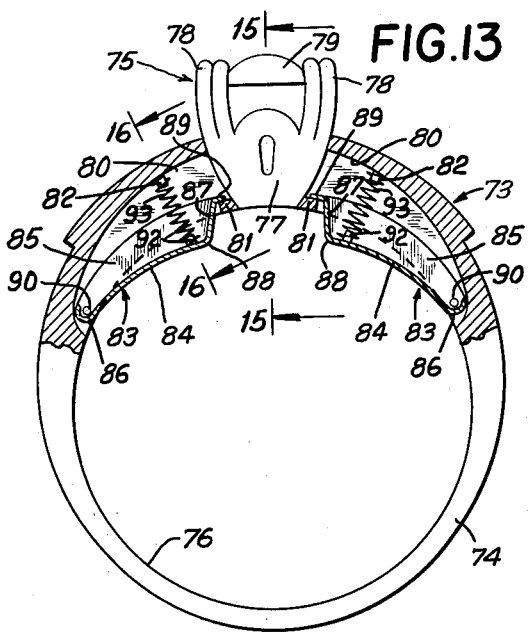
Figure 14:
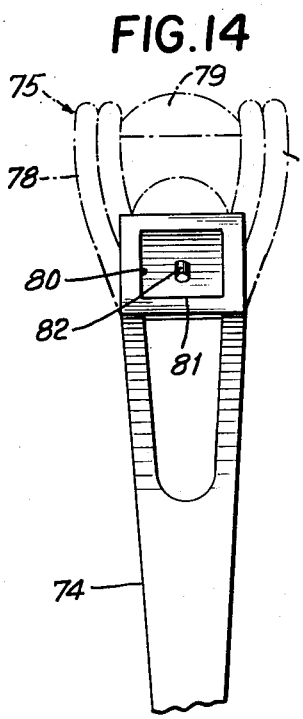
Figure 15:
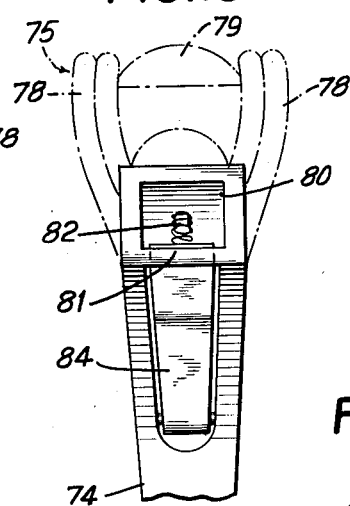
Figure 16:
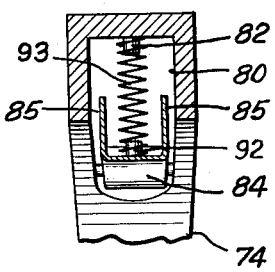

Figure 8 also corresponds to Figure 2 and is illustrative of another form of the invention;

Figure 9 is a view in enlargement taken along line 9—9 of Figure 8;

Figure 10 is a view in enlargement taken along line 10—10 of Figure 8;

Figure 11 is a view in enlargement taken along line 11—11 of Figure 8;

Figure 12 is an end elevation view, partly in cross section, of another form of finger ring constructed in accordance with the invention, the self-adjusting means being omitted for better illustration of details and construction of the ring band and associated parts;

Figure 13 corresponds to Figure 12 and shows a preferred form of self-adjusting means operatively associated with the band;

Figure 14 is a view in enlargement taken along line 14—14 of Figure 12, the setting unit of the ring merely being represented by dot-dash lines for better illustration of other parts;

Figure 15 is a view in enlargement taken along line 15—15 of Figure 13, the setting unit again merely being shown in dot-dash lines;

Figure 16 is a view in enlargement taken along line 16—16 of Figure 13; and

Figure 17:
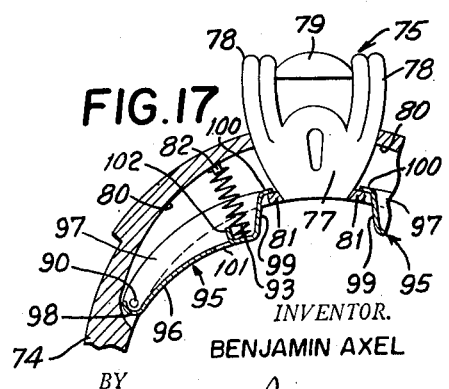

Figure 17 corresponds to a portion of Figure 13 and is illustrative of a modified form of the invention.

Figure 1:
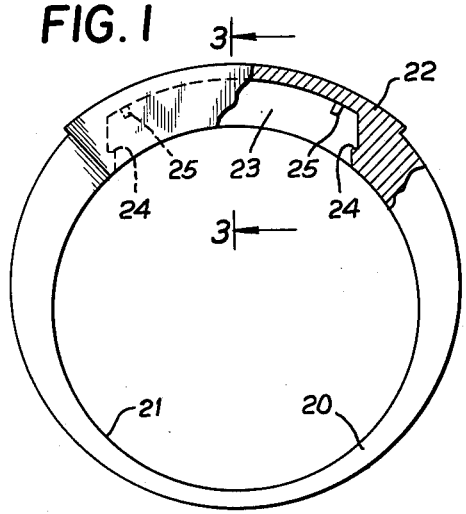

Referring now to the drawings, wherein like reference numerals identify corresponding parts throughout the several views, and more particularly to Figures 1 through 5, a continuous ring band 20 defines a substantially circular finger-receiving opening 21. The band may be provided with an integral decorative head 22. An elongated recess 23, formed in the band in the region of head 22, communicates with the finger-receiving opening, as best shown in Figure 1. The recess-defining portion of the band includes a pair of angularly spaced shoulders 24. Wholly within the recess is a pair of spaced spring aligning pin or lug elements 25.

Figure 4:
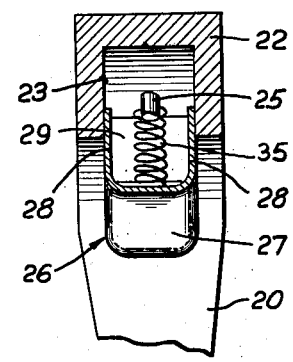
Figure 4 is a view in enlargement taken along line 4—4 of Figure 2.
Figure 5:
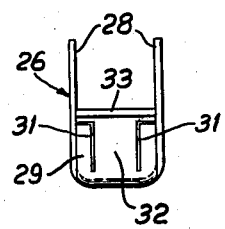
Figure 5 is a view in end elevation of a hollow member which forms a part of Figure 4.

Figures 2, 4 and 5 illustrate in detail the construction of a movable member 26 that constitutes a mean extending substantially the length and width of the recess, for varying the effective area of band opening 21. Member 26 is hollow and is preferably formed of sheet metal. It consists of an arcuate bottom wall 27, having an inner finger-engaging face, a pair of spaced parallel side walls 28, and a pair of spaced, generally parallel end walls 29. The ends of the bottom wall merge with the end walls with a flared or curved edge as indicated by reference numeral 30. Each end wall is slit, as indicated at 31 in Figure 5, to obtain a generally T-shaped portion 32 that has an outwardly extending lip or flange 33 at its free end. Member 26 is provided with a pair of pins or lug elements 34 that cooperate with corresponding elements 25 to align helical compression springs 35, as shown in Figure 2, when the parts are assembled. These springs normally and yieldingly urge member 26 in a direction toward the center of the ring band opening to the extent allowed by shoulders 24 in cooperation with lips 33 (Figure 2).

When member 26 is in its normal position, as shown in Figure 2, it projects inwardly of the periphery of the finger-receiving opening of the band, thereby decreasing the effective area of the opening. The member is adapted to be moved away from the center of the opening against the action of springs 35 to a retracted position substantially flush with the periphery of the opening to correspondingly increase the effective area of the band opening. It will thus be apparent that the member and spring arrangement permits the ring to be readily moved past a knuckle of a user's finger without injury thereto, and subsequently snugly and comfortably retains the ring in its normal location on the finger.

Figure 6:
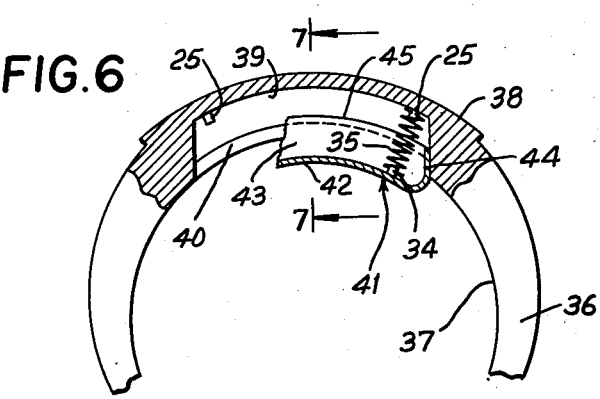
Figure 6 is a view corresponding to Figure 2 and shows a modified form of the invention, parts being broken away and other parts being omitted for better illustration.
Figure 7:
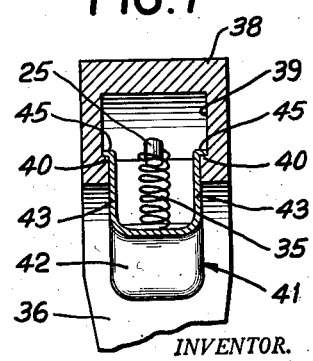
Figure 7 is an enlarged view taken along line 7—7 of Figure 6.

The modification of the invention shown in Figures 6 and 7 is the same in most respects as the form of the invention shown in Figures 1-5. The modification also comprises a ring band 36, having a finger-receiving opening 37, a head 38, and an elongated recess 39. The modification contemplates providing shoulders 40 that are spaced along the axis of the ring band instead of being spaced angularly as in the case of shoulders 24 of the first described form of the invention.

A hollow member 41, generally the same as movable member 26, also includes an arcuate bottom wall 42, having an inner finger-engaging face, side walls 43, and end walls 44. Here, the side walls are provided with outwardly extending lips or flanges 45 that engage corresponding shoulders 40 in the ring band to limit movement of member 41 toward the center of the band opening.

Reference is now had to Figures 8 through 11 which illustrate another modification of the invention. This modification likewise comprises a ring band 50, having a finger-receiving opening 51, and a head 52. Recess 53 of this modification is further elongated as compared to the recess of the earlier described forms of the invention. The band is also provided with a pair of angularly spaced shoulders 54.

This modification contemplates utilizing a hollow member 55 that is of two-piece construction, as distinguished from one-piece hollow members 26 and 41 earlier described, and that extends substantially the length and width of the recess. Member 55 comprises a first unit 56 and a second unit 57. Unit 56 consists of an arcuate bottom wall 58, having an inner finger-engaging face, a pair of spaced side walls 59, each having an extension 60, and a single end wall 61 that terminates in an outwardly projecting lip 62. Bottom wall 58 and end wall 61 merge with a curved or flared edge as indicated at 63.

Similarly, unit 57 consists of an arcuate bottom wall 64, having an inner curved finger-receiving face, a pair of spaced side walls 65, each having an extension 66, and an end wall 67 that terminates in an outwardly projecting lip 68. Bottom wall 64 and end wall 67 also merge with a curved or flared edge as indicated at 69. Units 56 and 57, which together form the movable means for varying the effective area of finger-receiving opening 51, are pivoted with respect to the band and to each other through the medium of a pin 70 that extends through extensions 60 and 66 and is supported by the band.

As is best shown in Figure 8, compression springs 35 normally and yieldingly urge both units about the axis of pin 70 in a direction generally toward the center of finger-receiving opening 51. Lips 62 and 68 engage with corresponding shoulders 54 to limit movement of the units in said direction.

Another form of finger ring constructed in accordance with this invention is shown in Figures 12 through 16. Referring first to Figures 12 and 13, I have illustrated therein a finger ring 73 that comprises a band 74 having a mounting or setting unit 75 incorporated therein and defining a substantially circular finger-receiving opening 76. The setting unit includes a base 77, the lower surface of which merges with and is in continuation of the remainder of the inner surface of the band, and a plurality of arcuate upstanding prongs 78 that constitute ornamental extensions of corresponding portions of the base. The prongs are adapted to receive and retain a gem, or the like, 79.

As best shown in Figure 12, the band is provided with a pair of circumferentially spaced recesses 80 that lie to opposite sides of setting unit 75 and that communicate with band opening 76. Each recess-defining portion of the band includes a stop element, such as a shoulder 81, that is adjacent to the setting unit. Wholly within each recess 80 is a spring-aligning pin 82 that projects generally toward the center of the band opening.

Reference is next had to Figures 13, 15 and 16 for an understanding of the details of construction of movable members 83 that constitute a preferred means for varying the effective area of band opening 76. Each member 83 is hollow and consists of an arcuate bottom wall 84, having an inner finger-engaging face, a pair of spaced parallel side walls 85 (Figure 16), a curved end wall 86 and an inclined, generally planar end wall 87. Each bottom wall 84 and corresponding end wall 87 merge with a curved or flared edge, as indicated at 88. Each end wall 87 has an outwardly projecting lip or extension 89. Each member 83 registers with a corresponding recess 80 and is pivotally connected to the band proximate its end wall 86 by a pin 90 that registers with openings 91 in the recess-defining portions of the band. Each bottom wall 84 carries a pin 92 that is adjacent to corresponding end wall 87. Partly in each recess 80 and partly in a corresponding member 83 is a helical compression spring 93 that engages and is maintained in alignment by corresponding pins 82 and 92. As will be apparent from an examination of Figure 13, each spring normally and yieldingly urges corresponding member 83 inwardly with respect to the band about its pivot pin 90. Such inward movement of each member 83 is limited by its lip 89 engaging the corresponding shoulder 81.

When members 83 are in their illustrated normal position with respect to the band (Figure 13), they both project into ring opening 76, thereby decreasing the effective area of that opening. Both members are adapted to be moved upwardly and into recesses 80 against the action of springs 93 to thereby correspondingly increase the effective area of the opening. It will hence be apparent that the arrangement of members 83 and springs 93 permits the ring to be readily moved past the knuckle of a user's finger and subsequently snugly and comfortably retains the ring in its normal location on the finger.

Figure 17 illustrates a modification of the invention that is the same in most respects as the form of the invention shown in Figures 12 through 16. In this modification, each of a pair of hollow members 95 registers with a corresponding band recess 80 and is pivotally connected to the band by a pin 90. Each hollow member 95 includes an arcuate bottom wall 96, having an inner finger-engaging face, a pair of parallel spaced side walls 97, a curved end wall 98, and an inclined, substantially planar end wall 99 that has an outwardly projecting lip or extension 100. Each member 95 is identical with earlier described member 83 except that, in lieu of having a spring-aligning pin, bottom wall 96 is pierced, as indicated at 101, and bent inwardly to obtain an upstanding tongue 102. The portion of member 95 to the right of tongue 102 as viewed in Figure 17, constitutes a pocket for receiving and containing the lower end portion of compression spring 93 which normally and yieldingly urges member 95 inwardly with respect to the ring band about pivot pin 90 as allowed by shoulder 81 and lip 100.

Thus it will be seen that the constructions herein shown and described are well adapted to accomplish the objects of the present invention. It will be understood, however, that the invention may be embodied otherwise than here shown, and that in the forms illustrated certain obvious changes in construction may be made. Therefore, I do not wish to be limited precisely to the constructions herein shown except as may be required by the appended claims considered with reference to the prior art.

I claim:

1. A finger ring comprising a band defining a finger-receiving opening, said band having an elongated recess extending throughout a substantial portion thereof and communicating with said opening, movable means mounted in said recess and extending substantially the length and width thereof provided with inner, side, and end faces for varying the effective area of said finger-receiving opening, the inner and end faces of said means merging together with flared edges to prevent injury to the wearer's finger, resilient means positioned intermediate said band and said movable means to urge at least a portion of said movable means to normally project inwardly of the periphery of the finger-receiving opening and to permit the retraction thereof to a position substantially flush with the periphery of said opening, and means for limiting the movement of at least a portion of said movable means in a direction inwardly of the finger-receiving opening.

2. A finger ring comprising a band defining a finger-receiving opening, said band having an elongated recess extending throughout a substantial portion thereof and communicating with said opening, movable means formed of sheet metal and being generally U-shaped in transverse cross section mounted in said recess and extending substantially the length and width thereof provided with inner and side faces, for varying the effective area of said finger-receiving opening, resilient means positioned intermediate said band and said movable means to urge at least a portion of said movable means to normally project inwardly of the periphery of the finger-receiving opening and to permit the retraction thereof to a position substantially flush with the periphery of said opening, and means for limiting the movement of at least a portion of said movable means in a direction inwardly of the finger-receiving opening.

3. A finger ring comprising a band defining a finger-receiving opening, said band having an elongated recess extending throughout a substantial portion thereof and communicating with said opening, a pair of spaced shoulders positioned within said elongated recess of said band, movable means mounted in said recess and extending substantially the length and width thereof provided with inner, side and end faces for varying the effective area of said finger-receiving opening, the inner and end faces of said means merging together with flared edges to prevent injury to the wearer's finger, said movable means including a pair of spaced lips that engage said spaced shoulders to limit movement of at least a portion of said movable means inwardly of said finger-receiving opening, and resilient means positioned intermediate said band and said movable means to urge at least a portion of said movable means to normally project inwardly of the periphery of the finger-receiving opening and to permit the retraction thereof to a position substantially flush with the periphery of said opening.

4. A finger ring in accordance with claim 3 wherein the shoulders and cooperating lips are spaced angularly with respect to the axis of the band.

5. A finger ring in accordance with claim 3 wherein the shoulders and cooperating lips are spaced along the axis of the band.

6. A finger ring comprising a band defining a finger-receiving opening, said band having an elongated recess extending throughout a substantial portion thereof and communicating with said opening, a pair of spaced shoulders positioned within said elongated recess of said band, movable means formed of sheet metal and being generally U-shaped in transverse cross section mounted in said recess and extending substantially the length and width thereof for varying the effective area of said finger-receiving opening, provided with inner and side faces, said movable means including a pair of spaced lips that engage said spaced shoulders to limit movement of at least a portion of said movable means inwardly of said finger-receiving opening, resilient means positioned intermediate said band and said movable means to urge at least a portion of said movable means to normally project inwardly of the periphery of the finger-receiving opening with said lips in abutting relationship with said shoulders and to permit the retraction thereof to a position substantially flush with the periphery of said opening.

7. A finger ring comprising a band defining a finger-receiving opening, said band having an elongated recess extending throughout a substantial portion thereof communicating with said opening, a pair of spaced shoulders positioned within said elongated recess of said band, a hollow member slidably mounted in said recess having a portion projecting into said opening, said member extending substantially the length and width of said opening and comprising an inner wall having an arcuate shaped finger engaging surface, a pair of spaced side walls and a pair of spaced end walls, an outwardly projecting lip carried by each wall of one of said pairs of spaced walls, and resilient means positioned intermediate said band and said hollow member to urge said member to normally project inwardly of the periphery of the finger-receiving opening with said lips in abutting relationship with said shoulders and to permit the retraction of said member to a position substantially flush with the periphery of said opening.

8. A finger ring in accordance with claim 7 wherein the shoulders and cooperating lips are spaced angularly with respect to the axis of the band.

9. A finger ring in accordance with claim 7 wherein the shoulders and cooperating lips are spaced along the axis of the band.

10. A finger ring in accordance with claim 3 wherein the movable means comprises a pair of units positioned in substantial end to end relationship, each unit being pivotally connected to said band proximate adjacent ends.

11. A finger ring in accordance with claim 6 wherein the movable means comprises two units each of which is pivotally mounted at adjacent ends thereof on a common axis positioned within said recess.

12. A finger ring in accordance with claim 1 wherein the movable means is pivotally connected to the band and includes a lip, and the means for limiting movement of at least a portion of the movable means in a direction inwardly of the finger-receiving opening comprises a shoulder positioned within the recess of the band and engageable by the lip.

13. A finger ring in accordance with claim 1 wherein the band includes a setting unit and the elongated recess is disposed to one side of the setting unit, said band having a second elongated recess disposed to the opposite side of the setting unit, a second movable means mounted in the second recess, both of said movable means being pivotally connected to the band about independent axes.

14. A finger ring in accordance with claim 2 wherein the band includes a setting unit and the elongated recess is disposed to one side of the setting unit, said band having a second elongated recess disposed to the opposite side of the setting unit, a second movable means mounted in the second recess, both of said movable means being pivotally connected to the band about independent axes, a first pin in each recess, and a second pin in each movable means, said resilient means comprising a spring that is engaged by corresponding first and second pins.

15. A finger ring in accordance with claim 2 wherein the band includes a setting unit and the elongated recess is disposed to one side of the setting unit, said band having a second elongated recess disposed to the opposite side of the setting unit, a second movable means mounted in the second recess, both of said movable means being pivotally connected to the band about independent axes, a pin in each recess, each of said movable means including an inner wall and an end wall, each inner wall carrying a tongue that is struck therefrom and projects into the corresponding movable means, said tongue being positioned intermediate the corresponding pivotal connection and end wall, said resilient means comprising a spring for each movable means, one end portion of each spring being engaged by a corresponding pin and the other end portion being positioned in the space between the corresponding tongue and end wall.

BENJAMIN AXEL.

No references cited.